April 13, 1954      A. C. SEBESTA      2,675,170
RECORD CARD CONSTRUCTION

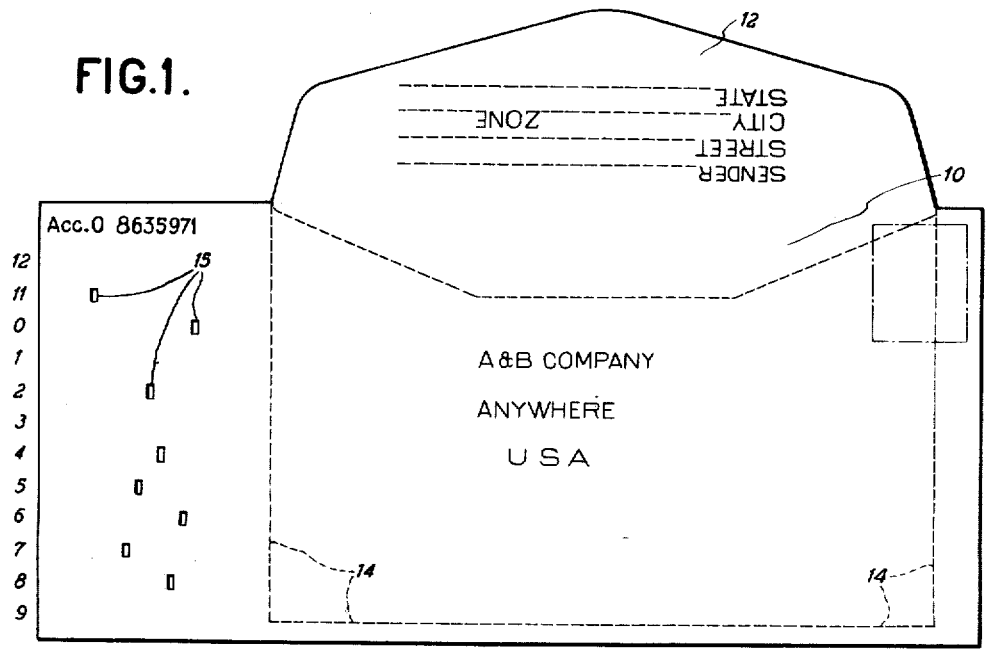
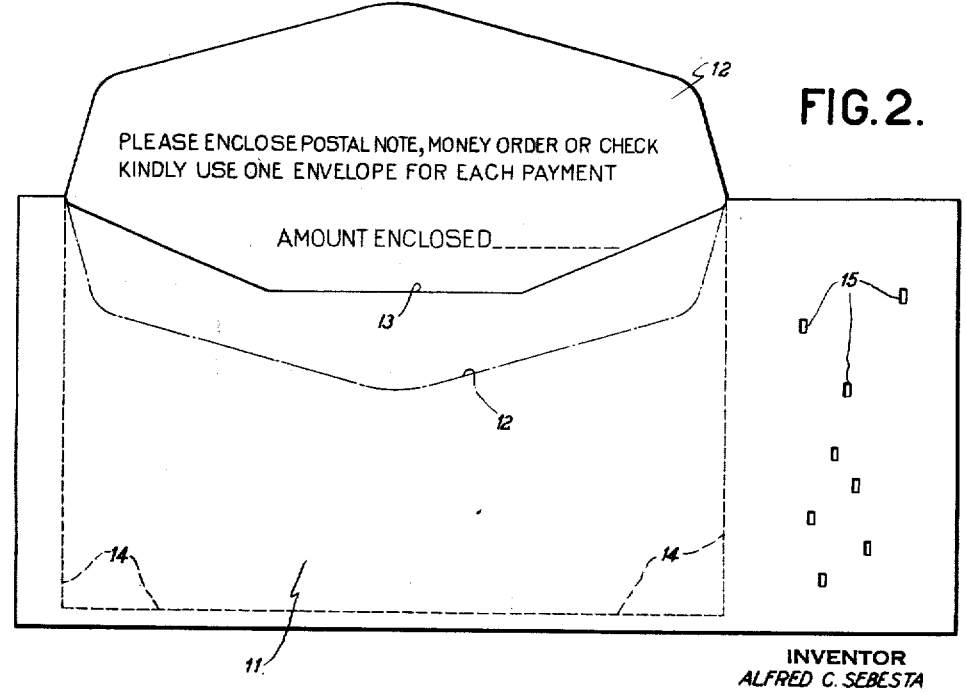

Filed Sept. 16, 1950      2 Sheets-Sheet 2

INVENTOR
ALFRED C. SEBESTA
BY William Lang
ATTORNEY

Patented Apr. 13, 1954

2,675,170

UNITED STATES PATENT OFFICE 2,675,170

RECORD CARD CONSTRUCTION

Alfred C. Sebesta, Vestal, N. Y., assignor to International Business Machines Corporation, New York, N. Y., a corporation of New York Application September 16, 1950, Serial No. 185,187

1 Claim. (Cl. 229—68)

This invention relates to perforated record cards and more particularly to a unitary structure comprising a record card and envelope.

In many accounting procedures, for example, in the handling of installment accounts wherein a purchaser is to make periodic payments, he is provided with a set of payment reminders, one of which is to be forwarded with each payment. This requires on his part, the provision of an envelope to be addressed by him (or a self-addressed envelope may be provided by the seller), in which his reminder and check or money order are inserted for mailing. The seller, upon receipt of a payment in this manner, must post the payment against the customer's account and, where the accounting system is based upon the use of well known perforated record cards, he must prepare a suitable card by punching therein data relating to the account.

The present invention proposes to simplify the procedure by providing the customer with a set of pre-punched record cards each containing data pertinent to the account, and each of which constitutes a combination record card and self-addressed envelope in which he need only insert his check or money order, seal and deliver to the post office.

Upon receipt, the seller need simply open the envelope, verify the enclosure and thereafter pass the card through standard accounting equipment for sorting, posting and other record keeping purposes.

Other objects of the invention will be pointed out in the following description and claim and illustrated in the accompanying drawings, which disclose, by way of example, the principle of the invention and the best mode, which has been contemplated, of applying that principle.

In the drawings:

Fig. 1 is a face view of the combination record card and envelope.

Fig. 2 is a back view of the combination record card and envelope.

Figure 3:
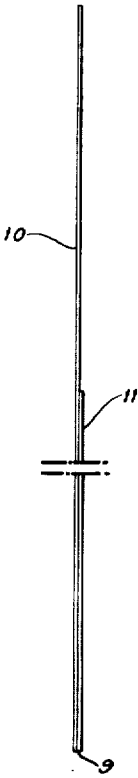
Fig. 3 is an end elevation of Fig. 1.

Referring to the drawings, the subject of the invention comprises a front sheet 10 and a rear sheet or layer 11, of which sheet 10 has the configuration shown in Fig. 1 where it is shown as substantially rectangular in outline with an upwardly extending flap 12. The outline of the sheet or layer 11 is shown in Fig. 2, where it has the same rectangular dimension as sheet 10, but in line with the flap 12 there is a cut-out portion 13. The two sheets are superimposed with square side and bottom edges as at edge 9 in Fig. 3 and cemented together along the left and right hand edges and also along the bottom edges to the limits defined by lines 14. There is thus formed a pocket open at the top and defined by the lines 14.

The total thickness of the two layers is equal to that of the well known perforated record cards, and the left margin is provided with perforations designated 15 which can be made in standard perforating machines to record data, such as a person's name, money value, and other information, in the well known index point positions indicated along the left side of the figure. The face of the sheet 10 may also be provided with a return address as indicated, and the reverse of this sheet may have designations printed thereon to designate "amount enclosed" and other matter.

Preferably, the sheet 10 is made of thinner stock than sheet 11, so that when the flap 12 is folded over for sealing purposes, as indicated in Fig. 2, it does not add greatly to the total thickness of the card at the area of the flap.

As mentioned hereinabove, this combination card and envelope may be used by the purchaser to forward a payment in the form of a check or money order by inserting the same in the pocket formed by the outline 14 and the folding of the flap and sealing thereof. Preferably, the line on which the flap is to fold may be lightly scored to facilitate closure.

Figure 4:
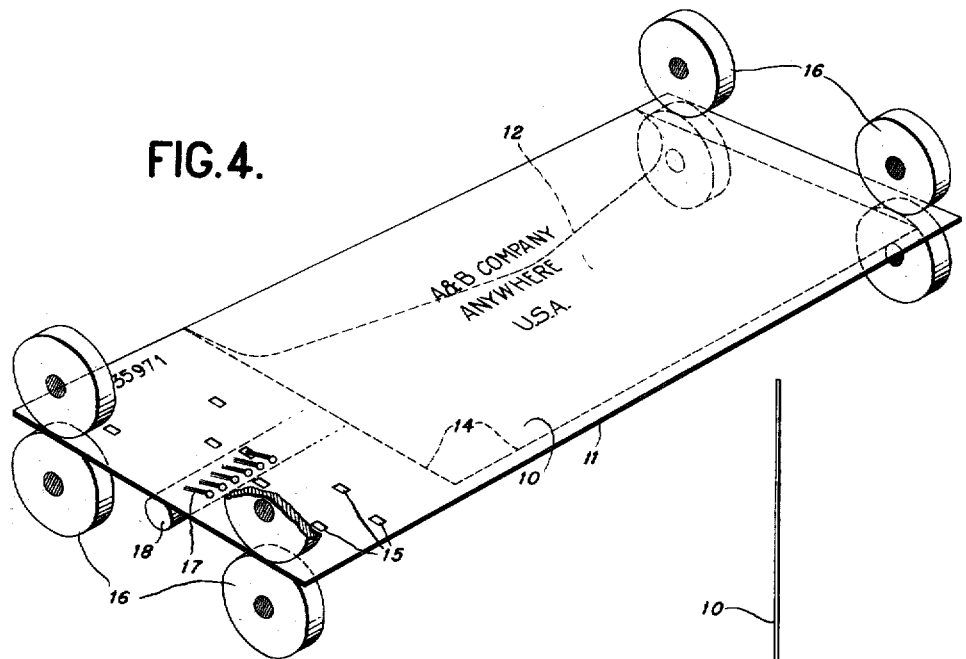
Fig. 4 is a diagrammatic view showing the manner in which the record is passed through an accounting machine.

Fig. 4 shows a form of feeding device which comprises feed rollers 16 located to traverse the outer edges of the combination card and envelope which, as seen from Figs. 1 and 2, is that portion of the structure which is of the thickness of standard record cards and, therefore, may be handled in the same manner as such cards. The envelope area lying within the lines 14 passes between the rollers and the slight extra thickness in the area of the flap does not come into engagement with the rollers. Between the feed rollers there is usually located a row of sensing brushes 17 which, as the card moves past the same, will make contact through perforations therein with a contact roller 18 to complete circuits for controlling the machine in the well known manner for sorting, adding or other statistical purposes.

Where the device is employed to carry nothing more than a check or money order, which does not create undue thickness within the area of the card-envelope, its contents may be fed through a structure such as that of Fig. 4 without difficulty. In practice, it is preferable to open the envelope by machine, remove the contents, make a note on the record that the value of the payment is correct, and then handle the envelope as a standard billing card from that point on.

While there have been shown and described and pointed out the fundamental novel features of the invention, as applied to a single modification, it will be understood that various omissions and substitutions and changes in the form and details of the device illustrated and in its operation may be made by those skilled in the art without departing from the spirit of the invention. It is the intention, therefore, to be limited only as indicated by scope of the following claim.

What is claimed is:

A combined mailing envelope and record element for use in punch card classification systems and including as a unitary structure a tabulating card portion and an envelope portion, said unitary structure comprising two separate layers of sheet material of dimensions equal to one standard perforated tabulating card and cemented together along three edges to form a pocket between the layers, said cemented edges being square in elevation end view along the bottom and sides and the cementing along one edge extending inwardly approximatley one-fourth of the length of the element to form a rigid double ply record section, said two plies of said record section adhering one to the other throughout the entire area of said record section, and in which perforations are made to represent data, said combined record section and envelope constituting a unit which is adapted when so formed to be handled as a standard billing card, and one of said layers being extended to form a sealing flap coextensive with said pocket.

References Cited in the file of this patent

UNITED STATES PATENTS

| Number | Name | Date |
| --- | --- | --- |
| 117,818 | Rowland | Aug. 8, 1871 |
| 642,839 | D'Arcy | Feb. 6, 1900 |
| 1,145,093 | Swift | July 6, 1915 |
| 1,319,525 | Gilbertson | Oct. 21, 1919 |
| 2,342,702 | Sherman | Feb. 29, 1944 |
| 2,357,444 | Armbruster | Sept. 5, 1944 |